United States Patent
Chu et al.

(10) Patent No.: US 10,594,505 B2
(45) Date of Patent: Mar. 17, 2020

(54) SYSTEM AND METHOD FOR AVOIDING DEADLOCK IN TRANSMISSION OF BROADCAST TRAFFIC IN A SERVER SYSTEM

(71) Applicant: Quanta Computer Inc., Taoyuan (TW)

(72) Inventors: Wei-Yi Chu, Taoyuan (TW); Chia-Feng Cheng, Taoyuan (TW); Chia-Ming Liang, Taoyuan (TW); Meng-Huan Lu, Taoyuan (TW)

(73) Assignee: QUANTA COMPUTER INC., Taoyuan (TW)

(*) Notice: Subject to any disclaimer, the term of this patent is extended or adjusted under 35 U.S.C. 154(b) by 103 days.

(21) Appl. No.: 15/007,804

(22) Filed: Jan. 27, 2016

(65) Prior Publication Data
US 2017/0214539 A1     Jul. 27, 2017

(51) Int. Cl.
*H04L 12/18* (2006.01)
*H04L 12/26* (2006.01)
*H04L 29/08* (2006.01)
*H04L 12/947* (2013.01)
*H04L 12/931* (2013.01)
(Continued)

(52) U.S. Cl.
CPC ...... *H04L 12/1886* (2013.01); *H04L 12/1877* (2013.01); *H04L 12/1881* (2013.01); *H04L 43/0817* (2013.01); *H04L 43/0882* (2013.01); *H04L 49/201* (2013.01); *H04L 49/25* (2013.01); *H04L 67/1002* (2013.01);
(Continued)

(58) Field of Classification Search
None
See application file for complete search history.

(56) References Cited

U.S. PATENT DOCUMENTS 8,107,458 B1 * 1/2012 Ranganathan ........ H04L 41/12
370/254
2002/0152320 A1   10/2002 Lau
(Continued)

FOREIGN PATENT DOCUMENTS

CN    101252427 A    8/2008
CN    101631043 A    1/2010
(Continued)

OTHER PUBLICATIONS

Taiwanese Office Action for Application No. 105109092, dated May 31, 2017, w/ First Office Action Summary.
(Continued)

*Primary Examiner* — Thomas J Dailey
(74) *Attorney, Agent, or Firm* — Nixon Peabody LLP; Zhou Lu (57) ABSTRACT

A server system may include a plurality of internal hubs communicatively coupled to a plurality of server nodes. The plurality of internal hubs may communicate with an external hub to transmit broadcast traffic to reach a designated server node. A hub controller, a routing device coupled to the plurality of internal hubs, may select an internal hub from among a plurality of internal hubs based on a link status and a set of hub selection rules. Based on a status of active link and a relative priority of internal hubs, an internal hub is selected as a transmission channel to receive broadcast traffic from the external hub and direct the broadcast traffic to a corresponding server node.

17 Claims, 5 Drawing Sheets

(51) Int. Cl.
 *H04L 12/44* (2006.01)
 *H04L 12/70* (2013.01)
(52) U.S. Cl.
 CPC *H04L 2012/445* (2013.01); *H04L 2012/5624* (2013.01); *H04L 2012/5626* (2013.01)

(56) References Cited

U.S. PATENT DOCUMENTS

| | | | | |
|---|---|---|---|---|
| 2013/0010787 | A1* | 1/2013 | Chou | H05K 7/1498 370/389 |
| 2013/0097647 | A1 | 4/2013 | Brooks et al. | |
| 2013/0114620 | A1 | 5/2013 | Bogdanski | |
| 2013/0138979 | A1* | 5/2013 | Wang | H04L 12/6418 713/300 |
| 2014/0195639 | A1 | 7/2014 | Kamen et al. | |
| 2016/0004528 | A1* | 1/2016 | Price | G06F 8/65 717/173 |
| 2016/0019044 | A1* | 1/2016 | Stolarchuk | G06F 8/65 717/171 |
| 2016/0173199 | A1* | 6/2016 | Gupta | H04B 10/11 398/127 |
| 2016/0197853 | A1* | 7/2016 | Kumar | H04L 45/02 370/389 |
| 2017/0034057 | A1* | 2/2017 | Kapadia | H04L 45/745 |
| 2017/0085488 | A1* | 3/2017 | Bhattacharya | H04L 41/0813 |

FOREIGN PATENT DOCUMENTS

| | | |
|---|---|---|
| CN | 101827013 A | 9/2010 |
| CN | 102368739 A | 3/2012 |
| CN | 102377666 A | 3/2012 |
| CN | 103023669 A | 4/2013 |
| CN | 104954254 A | 9/2015 |

OTHER PUBLICATIONS

CN Office Action for Application No. 201610227061.0, dated Jun. 4, 2019, w/ First Office Action Summary.
CN Search Report for Application No. 201610227061.0, dated Jun. 4, 2019, w/ First Office Action.
CN Office Action for Application No. 201610227061.0, dated Sep. 10, 2019, w/ Second Office Action Summary.
CN Search Report for Application No. 201610227061.0, dated Sep. 10, 2019, w/ Second Office Action.

* cited by examiner

| DETECT LINK | | CONTROL LINK | |
|---|---|---|---|
| INTERNAL HUB_1 | INTERNAL HUB_2 | INTERNAL HUB PORT_1 | INTERNAL HUB PORT_2 |
| ON | ON | ENABLE | DISABLE |
| ON | OFF | ENABLE | DISABLE |
| OFF | ON | DISABLE | ENABLE |
| OFF | OFF | DISABLE | DISABLE |

| DETECT LINK | | CONTROL LINK | |
|---|---|---|---|
| INTERNAL HUB_1 | INTERNAL HUB_2 | SWITCH_1 | SWITCH_2 |
| ON | ON | OPEN | CLOSE |
| ON | OFF | OPEN | CLOSE |
| OFF | ON | CLOSE | OPEN |
| OFF | OFF | CLOSE | CLOSE |

SYSTEM AND METHOD FOR AVOIDING DEADLOCK IN TRANSMISSION OF BROADCAST TRAFFIC IN A SERVER SYSTEM

BACKGROUND

Field

This application relates to a server device, and more particularly to a method of transmission of broadcast traffic in a server device to avoid deadlock.

Background

In a typical computer system (e.g., a rack server in a data center), a server system includes a plurality of server nodes that communicate with an external hub (e.g. external routing switch) to transmit broadcast traffic. This is accomplished, in part, through an internal hub (e.g., an internal routing switch) associated with the external hub and the plurality of server nodes. Accordingly, the internal hub may be used to transmit the broadcast traffic from the external hub to a designated server node as requested by an administrative device (e.g. a user).

Servers may be used by different data centers with different computing needs. However, typical servers are pre-loaded with a single internal hub that may not be optimal for increased broadcast traffic and differing needs of the administrative devices. In addition, an increased number of server nodes in a server system require more integrated system architecture to provide a stable connection and efficient traffic flow.

SUMMARY

The following presents a simplified summary of one or more embodiments in order to provide a basic understanding of present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later.

In accordance with one or more aspects of the examples described herein, systems and methods are provided for transmission of broadcast traffic in a server system to avoid deadlock. The method includes determining a link status for a plurality of internal hubs communicatively coupled to a plurality of server nodes. The method includes selecting a one of the plurality of internal hubs to yield a selected internal hub based on the link status for the plurality of internal hubs and a set of hub selection rules. The method further includes restricting communications with an external hub exclusively to the selected internal hub.

In another aspect, an apparatus is provided for transmission of broadcast traffic in a server system. The apparatus includes at least one hub controller configured for determining a link status for a plurality of internal hubs communicatively coupled to a plurality of server nodes, selecting a one of the plurality of internal hubs to yield a selected internal hub based on the link status for the plurality of internal hubs and a set of hub selection rules, and restricting communications with an external hub exclusively to the selected internal hub.

In yet another aspect, a non-transitory computer-readable medium is provided for routing broadcast packets in a server system. The non-transitory computer-readable medium stores executable instructions which cause a system controller device to determine a link status for a plurality of internal hubs communicatively coupled to a plurality of server nodes, select a one of the plurality of internal hubs to yield a selected internal hub based on the link status for the plurality of internal hubs and a set of hub selection rules, and restrict communications with an external hub exclusively to the selected internal hub.

BRIEF DESCRIPTION OF THE DRAWINGS

These and other sample aspects of the present technology will be described in the detailed description and the appended claims that follow, and in the accompanying drawings, wherein:

DETAILED DESCRIPTION

Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

Figure 1A:
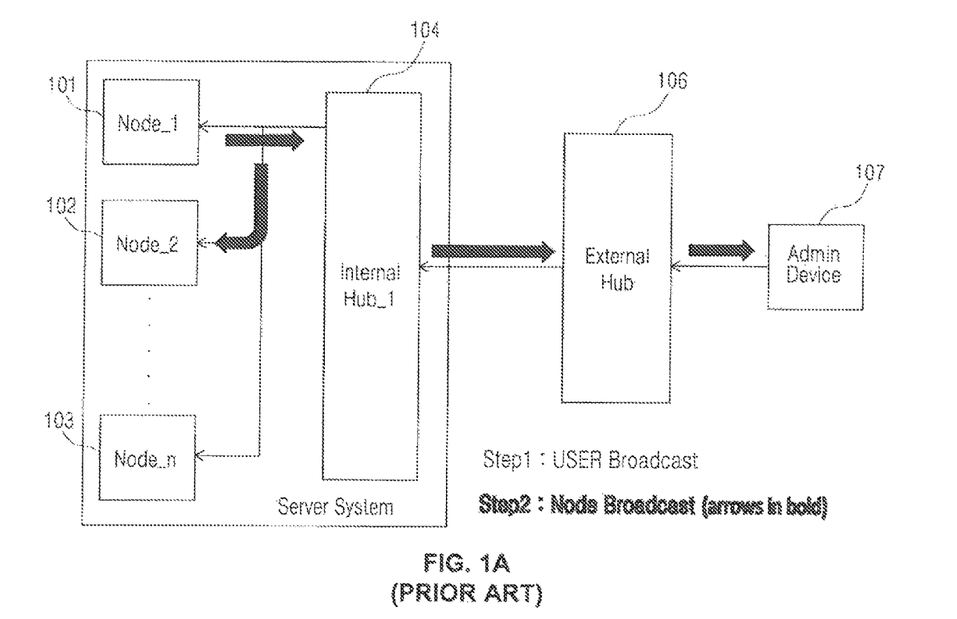
FIGS. 1A and 1B illustrate block diagrams that are useful for understanding various aspects of the present technology.

The subject disclosure provides techniques for avoiding deadlock when transmitting broadcast traffic in a server system in accordance with the present technology. The disclosure turns first to FIG. 1A, which illustrates a block diagram 100 that is useful for understanding various aspects of the present technology. A server system (e.g. a rack server) 104 can include an internal hub (e.g. an internal Ethernet routing device) that is communicatively coupled to a plurality of server nodes 101, 102, 103. The internal hub 104 may reside in the server system and communicate to the external hub 106 located outside the server system. As shown in FIG. 1A, the internal hub 104 can be connected to an administrative device (e.g. a user) through the external hub 106 (e.g. an external Ethernet routing device) and processes the broadcast data packets as requested by the administrative device 107. The administrative device can manage the server nodes by designating a specific server node and instructs the external hub to transmit the broadcast packets so as to reach the designated server node. For example, if the admin device 107 broadcasts to node_1 101, node_1 101 will broadcast back to the admin device 107 through the internal hub_1 104 and external hub 106. The administrative device can set a specific server node or internal hub with the highest relative priority as needed.

Figure 1B:
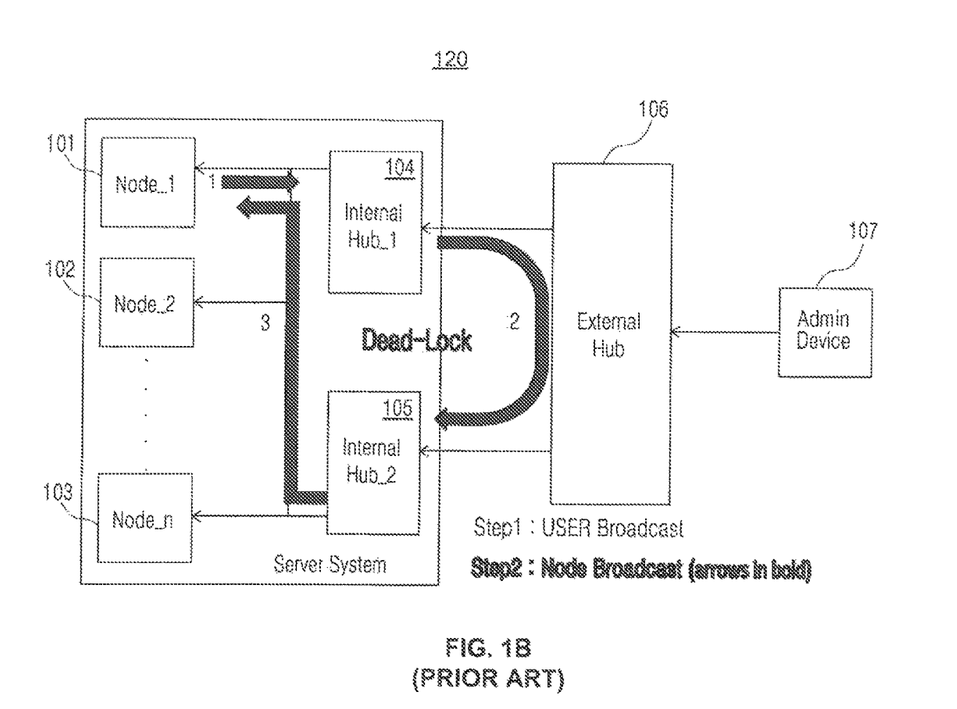

As the technology develops, a need to increase the number of server nodes has increased. To manage a higher number of server nodes, more than one internal hub is required for a better operation of a server system and a stable connection. One proposed solution has been to increase a number of internal hubs 104, 105 in the system 120 as illustrated in FIG. 1B. However, when more than one internal hub is coupled to the number of server nodes, a deadlock problem can cause due to an endless loop back flow as indicated in bold arrows in FIG. 1B. When the admin device 107 broadcasts to node1 101, node_1 101 broadcasts 1 to internal hub_1 104 at step 1. The internal hub_1 104 broadcasts to internal hub_2 105 through the external Hub 106 as indicated as step 2. The internal hub_2 105 may again broadcast to node_1 101 as step 3. Thus, the node_1 101 will be broadcasted twice and it can cause the deadlock problem.

Due to a lack of central system that manages the traffic flow from one internal hub to the other internal hub, each server node will broadcast to each other, and cause a resource conflict in a network.

Figure 2A:
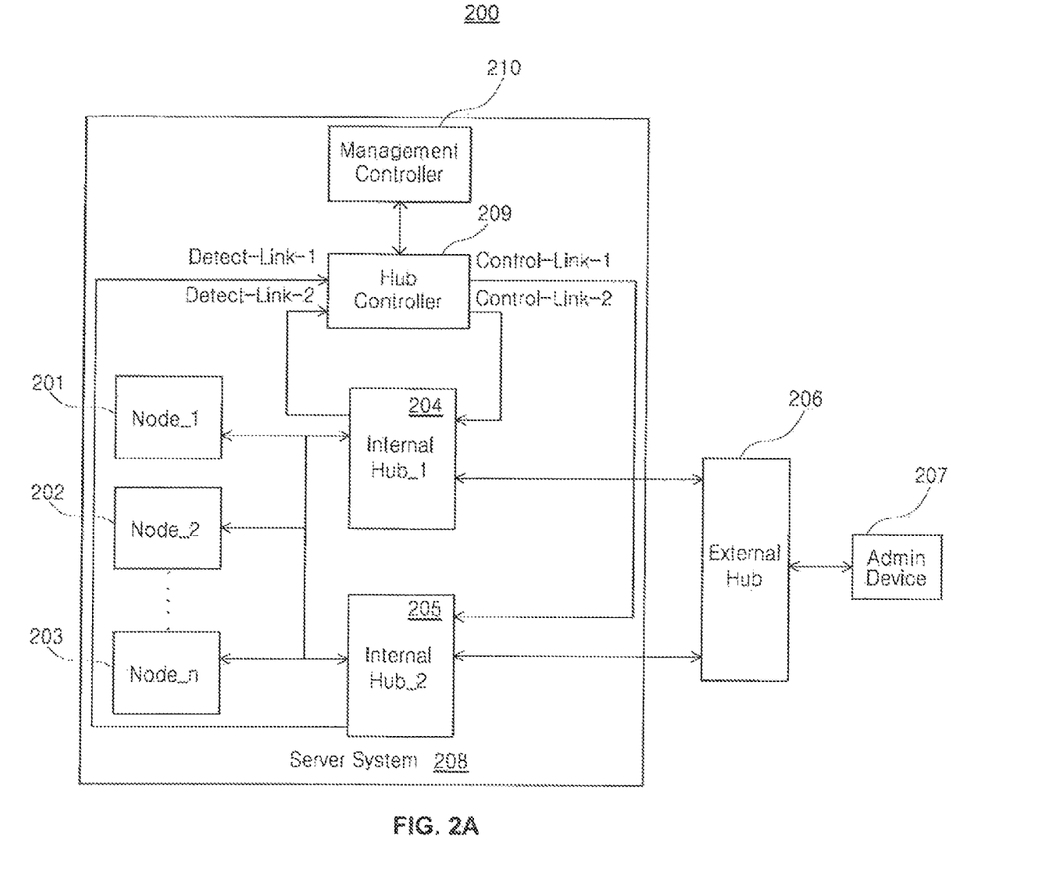
FIGS. 2A and 2B illustrate a block diagram of exemplary embodiment of directing broadcast traffic in a server system and an exemplary table showing restriction of communication based on a link status.
Figure 3A:
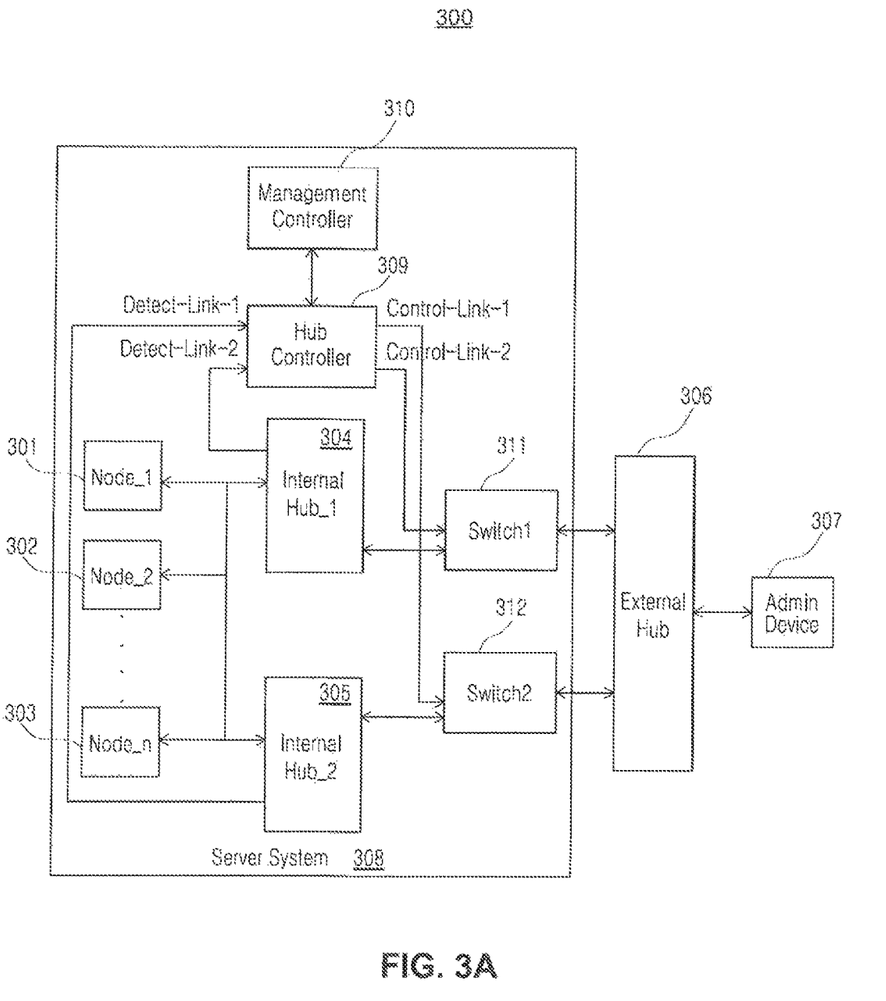
FIGS. 3A and 3B illustrate a block diagram of exemplary embodiment of directing broadcast traffic in a server system and an exemplary table showing restriction of communication based on a link status.

In view of the foregoing, the present disclosure provides a new methodology for avoiding deadlock issues and transmitting broadcast traffic when more than one internal hub resides in the server system. This is illustrated in FIG. 2A and FIG. 3A. In particular, FIG. 2A illustrates a block diagram 200 of an exemplary embodiment of transmitting broadcast traffic using a hub controller. To avoid deadlock issues, the server system 208 may include a hub controller 209 (e.g. a complex program logic device) that detects and controls the broadcast traffic. The hub controller (e.g. CPLD) may be a logic gate configured to provide a management/administration of servers and other routing devices. In some embodiments, the hub controller 209 can be connected to a management controller 210. The management controller 210 may be a baseboard management controller (BMC) that independently admins/manages a central processing unit and/or operating systems of a computing device. In some embodiments, the hub controller can be a part of management controller.

In some embodiments, the hub controller 209 may detect a link status for each of a plurality of internal hubs 204, 205. For example, each of the plurality of internal hubs (e.g. network switch) can be connected to the hub controller 209 through a detect link (e.g. detect-link_1 for internal hub_1, detect-link_2 for internal hub_2). Each detect link can be activated or de-activated by the administrative device 207 when requested. When detect links are active, the management controller 210 can assign a relative priority on each of the active detect links to prioritize the broadcast traffic. The detect link with the highest relative priority is selected as an internal hub as a main channel to direct the broadcast traffic. The highest relative priority indicates that it may be easy and efficient to send broadcast packets through the selected (associated) internal hub. Therefore, the communication between the external hub 206 and the designated node is restricted exclusively with the selected internal hub.

Accordingly, an output port of the selected internal hub is enabled by the hub controller to facilitate communication with the external hub 206. On the other hand, an output port of an unselected internal hub is disabled to restrict the external hub communication only with the selected internal hub. This can be further discussed with respect to FIG. 2B. For example, if a detect link associated with an internal hub_1 and another detect link associated with an internal hub_2 are both active, then a relative priority of these two detect links will be determined. But only one of the internal hubs will be selected as a transmission channel. As illustrated in the first row of a FIG. 2B table, both internal hub_1 detect link and internal hub_2 detect link are active. By way of one exemplary embodiment, a relative priority of internal hub_1 is determined to be higher in this case. Therefore, an output port of the internal hub_1 is enabled and an output port of the internal hub_2 is disabled to restrict the communication only with the internal hub_1.

In some embodiments, a detect link can be inactive. When the detect link is inactive, a relative priority becomes less important, because it then can be difficult to send the data packets through the associated internal hub. For example, as illustrated in the second row of table in FIG. 2B, when a detect link of internal hub_1 is active and a detect link of internal hub_2 is inactive, an output port of the internal hub_1 will be enabled and the output port of the internal hub_2 will be disabled by the hub controller. Thus, the communication from the external hub will be directed to only internal hub_1 and finally to a corresponding server node. In some embodiments, for example, as illustrated in the third row of table in FIG. 2B, when a detect link of internal hub_1 is inactive and a detect link of the internal hub_2 is active, an output port of the internal hub_1 will be disabled and the output port of the internal hub_2 will be enabled. Thus, the communication from the external hub will be directed to only internal hub_2 and a corresponding server node.

Figure 2B:
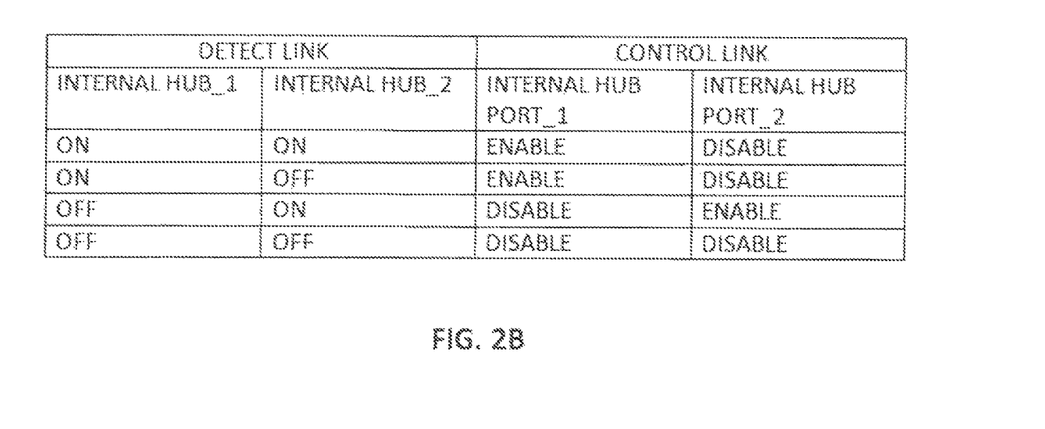

When both internal hubs are inactive as illustrated in the fourth row of the table, then none of output ports of internal hub_1 and internal hub_2 will be enabled and relative priorities of these inactive hubs will not be determined. However, if one of internal hubs (e.g. internal hub_2) goes from inactive (fourth row) to active (third row), then the host controller may detect a status change, enable the output port for internal hub_2, and determine a relative priority of the internal hub_2. For example, if the link status of one internal hub changes (in either case, active to inactive or inactive to active), a change in status will be communicated to the hub controller to make an appropriate action.

FIG. 3A illustrates an exemplary embodiment 300 when a switch resides in the server system. A switch 311, 312 can be an ON/OFF mechanical signal switch that an control transmission of signal. The switch1 311 is associated with an internal hub_1 304 and switch2 312 is associated with an internal hub_2 305. The admin device 307 can set either one of internal hubs 304, 305 with a higher relative priority to yield a selected internal hub as a broadcast traffic channel using a corresponding switch associated with the selected internal hub.

Figure 3B:
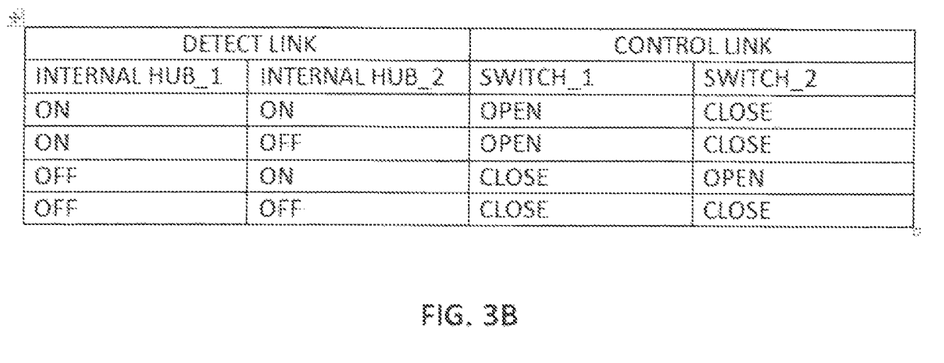

FIG. 3A will also be described with respect to a table in FIG. 3B. The hub controller 309 will identify an active link and determine a relative priority of the identified active link. For example, as illustrated in the first row of table in FIG. 3B, both detect links are determined to be active. Then the hub controller 309 will determine a relative priority for each of the identified active links. In this example, the relative priority of internal hub-1 is determined to be higher than the internal hub_2. Therefore, to restrict the communication exclusively with an internal hub_1, a switch1 311 (associated switch) will be opened and a switch2 312 will be closed.

The second row of table in FIG. 3B shows an exemplary scenario where an internal hub_1 is active and an internal hub_2 is inactive. In this case, the hub controller 309 will control both switch1 311 and switch2 312 to control the broadcast data transmission. For example, the hub controller 309 will open the switch1 311 and close the switch2 312, thus, makes the internal hub_1 (e.g. internal hub_1 is associated with the opened switch) a selected channel. The communication therefore will go from the external hub 306 to switch1 311, pass through internal hub_1 304, and ultimately to an associated server node.

In a related aspect, if an internal hub_1 is inactive and an internal hub_2 is active, the hub controller 309 will close the switch1 311 and open the switch2 312, thus, making the internal hub_2 (e.g. internal hub_2 is associated with the opened switch2 312) as a selected channel. The communication therefore will go from the external hub 306 to switch2

When both internal hubs are inactive as illustrated in the fourth row of the table, then both switches will be closed and relative priorities of these inactive hubs will not be determined. However, if one of internal hubs (e.g. internal hub_2) goes from inactive (fourth row) to active (third row), then the host controller may detect a status change, open the switch2 (internal hub_2 switch), and determine a relative priority of the internal hub_2.

Figure 4:
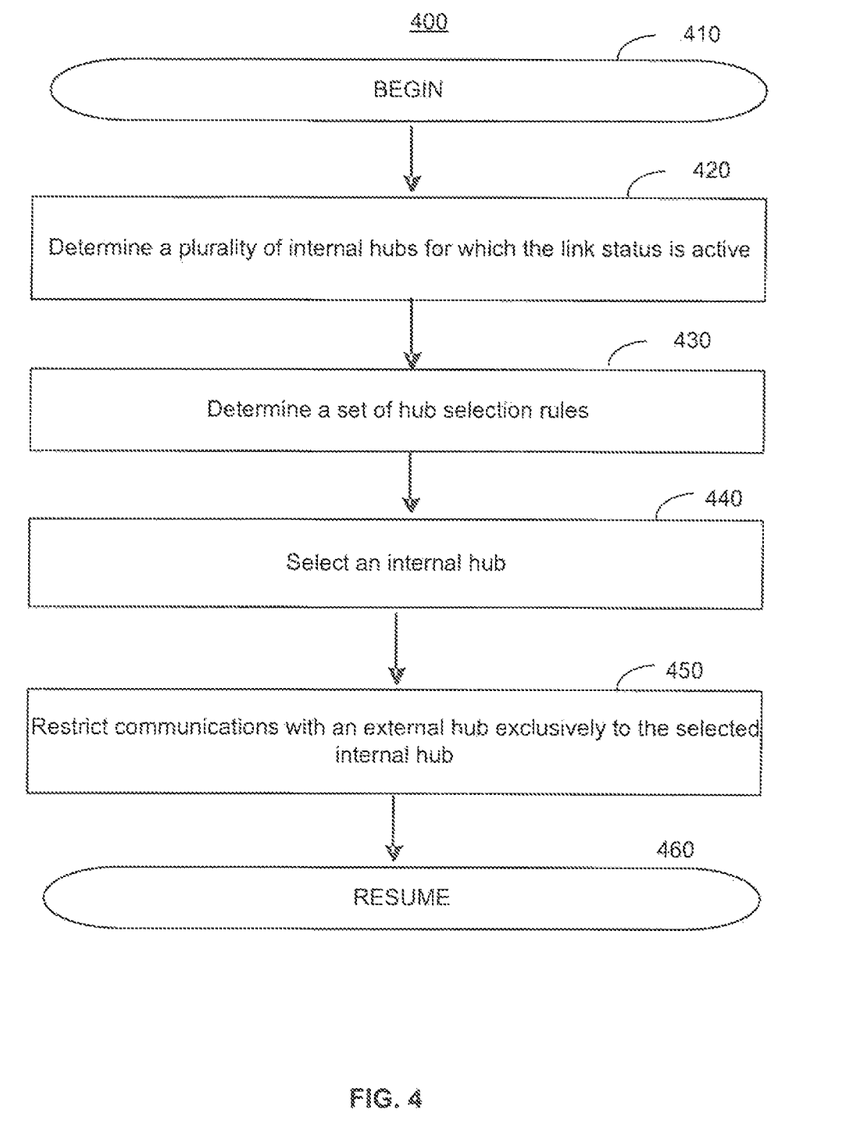
FIG. 4 illustrates a flow chart of an exemplary method of directing broadcast traffic in a server system.

In accordance with one or more aspects of the implementations described herein, FIG. 4 illustrates a flow chart of an exemplary method of directing broadcast traffic in a server system. The method 400 can start at step 410 when there is more than one internal hub in a server system. The server system can be a micro server system. At step 420, a hub controller can identify a plurality of internal hubs that are connected to the hub controller. The hub controller can then identify internal hubs of which a connecting link (e.g. a detect link) is active.

In some instances, a connecting link status can be changing from inactive to active while the hub controller is determining an active status of the plurality of internal hubs. The changing link will be considered as an active link and a relative priority value of the changing link will be considered to make a determination to select an internal hub with the highest priority.

At step 430, the hub controller will determine a set of hub selection rules to yield a selected internal hub as a transmission channel. The set of hub selection rules can be stored in the server system. In some embodiments, the admin device can send the set of hub selection rules to the server system for use. There may be many different hub selection rules that can be considered when choosing a set of hub selection rules to apply to a particular server configuration. One hub selection rule may be a relative priority rule.

The hub controller will determine a relative priority value of the plurality of internal hubs with respect to each other. Any internal hub with the highest relative priority may be selected as an internal hub. The relative priority can be determined in many ways such as bandwidth of internal hub or server node, specific value assigned by the admin device, or a number of server nodes connected to an internal hub. There can be other ways to select an internal hub, and the illustrated selection methods are not intended to be an exclusive list for selecting an internal hub.

For example, in some embodiments, a server node may be associated with a high priority, but an internal hub associated with that server node may be associated with a low priority. In this case, the hub selection may specify that the server node with the high priority can override the internal hub with the low priority. Thus, the internal node with the low priority may be selected as a transmission channel over other internal nodes with higher priorities to ensure the high priority server nodes gets access to the external hub.

In addition, a number of server nodes may be considered when the set of rules are to be determined. Even if a single internal hub may be associated with a high relative priority, it will be weighted differently if that internal hub is associated with more number of server nodes than the internal hub can optimally accommodate. Because a bandwidth capacity for each server node may not be as optimal, the internal hub will be less preferred than other internal hubs with less number of server nodes.

At step 440, the hub controller will select an internal hub based at least in part on the link status and a set of hub selection rules. At step 450, the hub controller will restrict the communication from the external hub only to the selected internal hub by managing operation of the internal hubs or switches associated with the internal hubs. The transmission process can resume at step 460.

Figure 5:
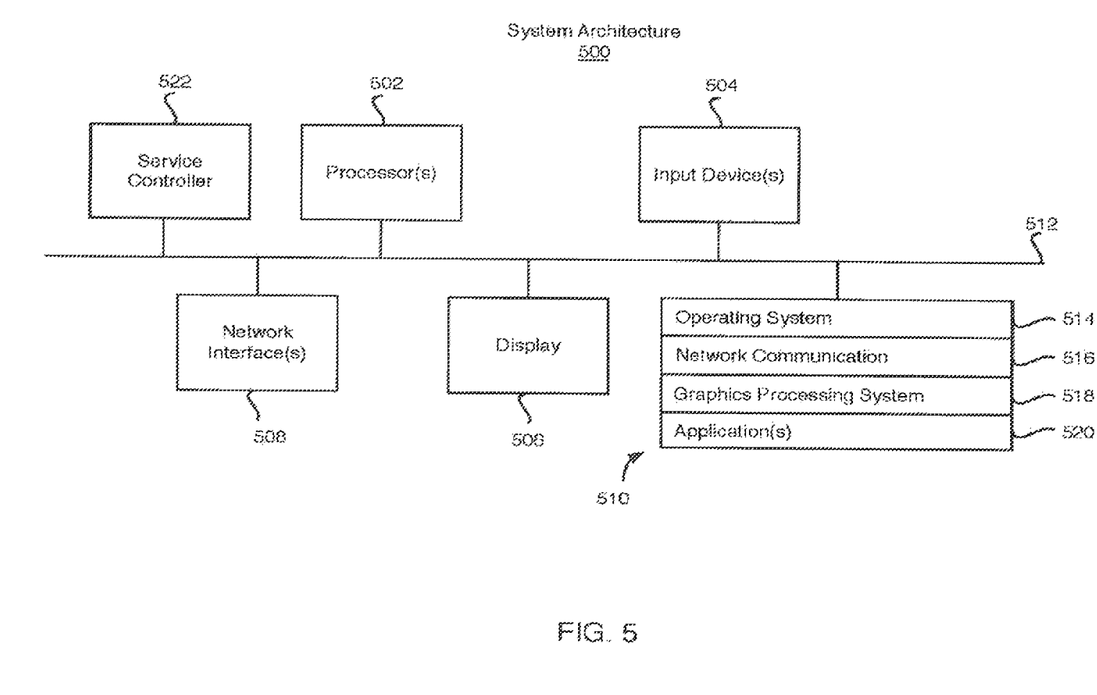
FIG. 5 illustrates a block diagram of an exemplary computer system.

FIG. 5 is a block diagram of exemplary system architecture 500 implementing the features and processes of FIGS. 1-4. The architecture 500 can be implemented on any electronic device that runs software applications derived from compiled instructions, including without limitation personal computers, servers, smart phones, media players, electronic tablets, game consoles, email devices, etc. In some implementations, the architecture 500 can include one or more processors 502, one or more input devices 504, one or more display devices 506, one or more network interfaces 508 and one or more computer-readable mediums 510. Each of these components can be coupled by bus 512.

Display device 506 can be any known display technology, including but not limited to display devices using Liquid Crystal Display (LCD) or Light Emitting Diode (LED) technology. Processor(s) 502 can use any known processor technology, including but are not limited to graphics processors and multi-core processors. Input device 504 can be any known input device technology, including but not limited to a keyboard (including a virtual keyboard), mouse, track ball, and touch-sensitive pad or display. Bus 512 can be any known internal or external bus technology, including but not limited to ISA, EISA, PCI, PCI Express, NuBus, USB, Serial ATA or FireWire.

Computer-readable medium 510 can be any medium that participates in providing instructions to processor(s) 502 for execution, including without limitation, non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 510 can include various instructions for implementing an operating system 514 (e.g., Mac OS®, Windows®, Linux). The operating system 514 can be multi-user, multiprocessing, multitasking, multi-threading, real-time and the like. The operating system 514 performs basic tasks, including but not limited to: recognizing input from input device 504; sending output to display device 506; keeping track of files and directories on computer-readable medium 510; controlling peripheral devices (e.g., disk drives, printers, etc.) which can be controlled directly or through an I/O controller; and managing traffic on bus 512. Network communications instructions 516 can establish and maintain network connections (e.g., software for implementing communication protocols, such as TCP/IP, HTTP, Ethernet, etc.).

A graphics processing system 518 can include instructions that provide graphics and image processing capabilities. Application(s) 520 can be an application that uses or implements the processes described in reference to FIGS. 1-4. The processes can also be implemented in operating system 514.

Service controller 522 can be a controller that operates independently of processor(s) 522 and/or operating system 514. In some implementations, service controller 522 can be powered and operational before processor(s) 502 are powered on and operating system 514 is loaded into processor(s) 502. For example, service controller 522 can provide for pre-OS management of the computing device through a dedicated network interface or other input device. For example, service controller 522 can be a baseboard management controller (BMC) that monitors device sensors (e.g., voltages, temperature, fans, etc.), logs events for failure analysis, provides LED guided diagnostics, performs power management, and/or provides remote management capabilities through an intelligent platform management interface (IPMI), keyboard, video, and mouse (KVM) redirection, serial over LAN (SOL), and/or other interfaces. Service controller 522 can be implement the processes described with reference to FIGS. 1-4 above. For example, service controller 522 can be configured to manage power supply units coupled to server rack.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:
1. A method, comprising:
 determining a link status for a plurality of internal hubs communicatively coupled to a plurality of server nodes, each internal hub of the plurality of internal hubs capable of communicating with an external hub;

determining a plurality of active internal hubs and inactive internal hubs based upon the link status, each of the plurality of active internal hubs having a corresponding link status as active;

based on a relative priority of the plurality of active internal hubs, selecting one of the plurality of active internal hubs to yield a selected internal hub while disenabling all output port(s) of all remaining active internal hub(s) of the plurality of active internal hubs, the selected internal hub having the highest priority among the plurality of active internal hubs, wherein the relative priority is determined based on at least one of: bandwidth of a corresponding internal hub, bandwidth of a corresponding server node, a specific value assigned by an administrative device, and a number of server nodes connected to the corresponding internal hub;

detecting the link status changing from inactive to active for one of the plurality of inactive internal hubs to determine a changed internal hub;

determining whether the changed internal hub is a higher priority than the selected internal hub;

selecting the changed internal hub as the selected internal hub on determining the changed internal hub is a higher priority than the selected internal hub; and restricting communications with an external hub exclusively to the selected internal hub.

2. The method of claim 1, wherein the restricting comprises:
closing a switch communicatively coupled to the selected internal hub and the external hub; and
opening other switches communicatively coupled to other ones of the plurality of active internal hubs and the external hub.

3. The method of claim 1, wherein the restricting comprises:
enabling an output port of the selected internal hub communicatively coupled to the external hub.

4. The method of claim 1, further comprising determining via hub selection rules the relative priority of the plurality of active internal hubs with respect to each other.

5. The method of claim 1, wherein the selecting further comprises:
identifying a portion of the plurality of active internal hubs for which the active link status is active;
determining a portion of the plurality of server nodes associated with the portion of the plurality of active internal hubs; and
choosing one of the portion of the plurality of active internal hubs associated with one of the portion of the plurality of server nodes with the relative priority that is highest as the selected internal hub.

6. A server system, comprising:
a hub controller;
a plurality of internal hubs;
an external hub;
a memory device including instructions, when executed by the [a] hub controller, cause the hub controller to:
determine a link status for the plurality of internal hubs communicatively coupled to a plurality of server nodes, each internal hub of the plurality of internal hubs capable of communicating with an external hub;
determine a plurality of active internal hubs and inactive internal hubs based upon the link status, each of the plurality of active internal hubs having a corresponding link status as active;

based on a relative priority of the plurality of active internal hubs, select one of the plurality of active internal hubs to yield a selected internal hub while disenable all output port(s) of all remaining active internal hub(s) of the plurality of active internal hubs, the selected internal hub having the highest priority among the plurality of active internal hubs, wherein the relative priority is determined based on at least one of: bandwidth of a corresponding internal hub, bandwidth of a corresponding server node, a specific value assigned by an administrative device, and a number of server nodes connected to the corresponding internal hub;

detect the link status changing from inactive to active for one of the plurality of inactive internal hubs to determine a changed internal hub;

determine whether the changed internal hub is a higher priority than the selected internal hub;

select the changed internal hub as the selected internal hub on determining the changed internal hub is a higher priority than the selected internal hub; and restrict communications with the external hub exclusively to the selected internal hub.

7. The server system of claim 6, wherein the instructions, when executed, further cause the hub controller to:
close a switch communicatively coupled to the selected internal hub and the external hub; and
open other switches communicatively coupled to other ones of the plurality of active internal hubs and the external hub.

8. The server system of claim 6, wherein the instructions, when executed, further cause the hub controller to
enable an output port of the selected internal hub communicatively coupled to the external hub.

9. The server system of claim 6, wherein the instructions when executed cause the hub controller to determine via hub selection rules the relative priority of the plurality of active internal hubs with respect to each other.

10. The server system of claim 6, wherein the instructions, when executed, further cause the hub controller to:
identify a portion of the plurality of active internal hubs for which the active link status is active;
determine a portion of the plurality of server nodes associated with the portion of the plurality of active internal hubs; and
choose one of the portion of the plurality of active internal hubs associated with one of the portion of the plurality of server nodes with the relative priority that is highest as the selected internal hub.

11. The server system of claim 6, wherein the hub controller is a baseboard management controller (BMC).

12. The server system of claim 6, wherein the instructions, further cause the hub controller to:
receive, from an administrative device, a server node request indicating the designated server node to send broadcast data packet.

13. The server system of claim 6, wherein the instructions, further cause the hub controller to:
receive, from the administrative device, a link request setting one of the plurality of server nodes with the relative priority that is highest than other ones of the plurality of server nodes.

14. A non-transitory computer-readable medium storing instructions which, when executed by a system controller, cause the system controller to perform operations comprising:

determining a link status for a plurality of internal hubs communicatively coupled to a plurality of server nodes, each internal hub of the plurality of internal hubs capable of communicating with an external hub;

determining a plurality of active internal hubs and inactive internal hubs based upon the link status, each of the plurality of active internal hubs having a corresponding link status as active;

based on a relative priority of the plurality of active internal hubs, selecting one of the plurality of active internal hubs to yield a selected internal hub while disenabling all output port(s) of all remaining active internal hub(s) of the plurality of active internal hubs, the selected internal hub having the highest priority among the plurality of active internal hubs, wherein the relative priority is determined based on at least one of: bandwidth of a corresponding internal hub, bandwidth of a corresponding server node, a specific value assigned by an administrative device, and a number of server nodes connected to the corresponding internal hub;

detecting the link status changing from inactive to active for one of the plurality of inactive internal hubs to determine a changed internal hub;

determining whether the changed internal hub is a higher priority than the selected internal hub;

selecting the changed internal hub as the selected internal hub on determining the changed internal hub is a higher priority than the selected internal hub; and restricting communications with an external hub exclusively to the selected internal hub.

15. The non-transitory computer-readable medium of claim 14, wherein the instructions, when executed, further cause the system controller to perform operations comprising:

closing a switch communicatively coupled to the selected internal hub and the external hub; and opening other switches communicatively coupled to other ones of the plurality of active internal hubs and the external hub.

16. The non-transitory medium of claim 14, wherein the instructions, when executed, further cause the system controller to perform operations comprising enabling an output port of the selected internal hub communicatively coupled to the external hub.

17. The non-transitory medium of claim 14, wherein the instructions, when executed by the hub controller determine via hub selection rules the relative priority of the plurality of active internal hubs with respect to each other.

* * * * *